United States Patent

Hansma et al.

Patent Number: 5,825,020
Date of Patent: Oct. 20, 1998

[54] ATOMIC FORCE MICROSCOPE FOR GENERATING A SMALL INCIDENT BEAM SPOT

[75] Inventors: Paul K. Hansma, Goleta; Tilman E. Schaffer, Santa Barbara; Jason P. Cleveland, Ventura, all of Calif.

[73] Assignee: The Regents of the University of California, Oakland, Calif.

[21] Appl. No.: 709,349

[22] Filed: Sep. 6, 1996

[51] Int. Cl.⁶ .................................. G01B 5/28; H01J 3/14
[52] U.S. Cl. .......................... 250/216; 250/234; 250/306; 73/105
[58] Field of Search .................................... 250/234, 235, 250/236, 216, 227.11, 227.26, 227.28, 306, 307; 356/376; 73/105

[56] References Cited

U.S. PATENT DOCUMENTS

| | | |
|---|---|---|
| 4,935,634 | 6/1990 | Hansma et al. . |
| 5,017,010 | 5/1991 | Manin et al. ............................ 356/345 |
| 5,144,833 | 9/1992 | Amer et al. ................................ 73/105 |
| 5,164,791 | 11/1992 | Kubo et al. . |
| 5,172,002 | 12/1992 | Marshall . |
| 5,206,702 | 4/1993 | Kato et al. . |
| 5,231,286 | 7/1993 | Kajimura et al. . |
| 5,260,824 | 11/1993 | Okada et al. . |
| 5,291,775 | 3/1992 | Gamble . |
| 5,298,975 | 3/1994 | Khoury et al. . |
| 5,388,452 | 2/1995 | Harp et al. .............................. 250/306 |
| 5,394,741 | 3/1995 | Kajimur aet al. . |
| 5,560,244 | 10/1996 | Prater et al. ............................ 250/306 |
| 5,616,916 | 4/1997 | Handa et al. ............................ 250/306 |
| 5,627,365 | 5/1997 | Chiba et al. ............................ 250/306 |
| 5,672,816 | 9/1997 | Park et al. ............................... 250/306 |

OTHER PUBLICATIONS

Drake et al.: "Imaging crystals, polmers and processes in waters with the atomic force microscope." *science* vol. 243, 1586 (1989) (no month).

Hansma et al.: "A new, common optical–lever based atomic force microscope, " *J.Appl.Phys.*, vol. 76, 796 (1994 ) (no month).

Clark et al.: "A high performance scanning force microscope head design, " *Rev.Sci.Instrum.*,vol. 64, No. 4,904 (1993) (no month).

Baselt, et al.: "Scanned–cantilever atomic force microscope head desig, " *Rev.Sci.Instrum.*, vol. 64,No. 4, 908 (1993) (no month).

(List continued on next page.)

*Primary Examiner*—Edward P. Westin
*Assistant Examiner*—John R. Lee
*Attorney, Agent, or Firm*—Fulbright & Jaworski

[57] ABSTRACT

An atomic force microscope utilizing an optical system having a numerical aperture sufficient with the wavelength of light of an incident beam to form a spot on the cantilever having a size of 8 μm or less in at least one dimension. An adjustable aperture can be utilized to control the size and/or shape of the incident beam spot on the cantilever. Portions of the incident beam and the beam reflected from the cantilever overlap and are directed so that the plane of focus of the incident beam is parallel to the plane of the cantilever. The incident and reflected light beams are separated by polarization using a beamsplitter in conjunction with a quarterwave plate. Focussing can be accomplished with a confocal viewing system coupled with a translatable focusing lens common to the optical system and viewing system. The atomic force microscope enables use with a plurality of cantilevers on the same chip wherein the focus of the incident beam is shifted from one cantilever to another while remaining substantially in focus. One of the focusing lenses can be mounted in close proximity to the cantilever to provide a high numerical aperture. An optional adjustable lens can also be mounted on the module. A piezoelectric tapping element can be embedded in a base plate of the cantilever module for tapping mode AFM.

23 Claims, 5 Drawing Sheets

OTHER PUBLICATIONS

Hipp et al.: "A stand–alone scanning force and friction microscope," *Ultramicroscopy*, vol. 42–44, 1498–1503 (1992) (no month).

Alexander, et al.: "An atomic resolution atomic–force micrscope implemented using an optical lever" *J. Appl. Phys.*, vol. 65, 164–167 (1989).

Binning et al.: "Atomic Force Microcope" *Phy.Rev.Let.*, vol. 56, No. 9 (1986) (no month).

Chalmers et al: "Determination of tilted superlattice structure by atomic force microscopy" *Appl. Phys. Let.*, vol. 55, No. 24 (1989) (no month).

Dietz et al.: "Atomic Force Microscopy of $C_{60}/C_{70}$ Single–Crystal Fullerenes under Ethanol" *Applied Phys.*, A.56,207–210 (1993) (no month).

Dietz et al.; "Molecular structure and thickness of highly oriented poly (tetrafluorethylene) films measured by atomic force microscopy"*J. of Materials Sci.*, (1993). (no month).

Erlandsson et al.: "Atomic force micrscopy using optical interferometry" *J. Vac.Sci.Technol.*(1988) (no month).

Hansma et al.: "Scanning tunneling Microscopy and Atomic Force Microscopy: Application to Biology and Technology" *Science.*, vol. 242, pp. 209–242 (1988) (no month).

Hansma et al: "A new optical lever based atomic force microscope" *J. Appl. Phys.*, vol. 76, (1994) (no month).

Hillner et al.: "AFM images of dissolution and growth on a calcite crystal" *Ultramicrosopy*, vol. 76, (1994) (no month).

Hillner et al.: Combined Atomic Force and Scanning Reflection Interference Contrast Microscopy: *Scanning*, vol. 17, 144–147 (1995).

Hillner et al.: "Combined Atomic Force and Confocal Laser Scanning Microscope"*JMSA*, vol. 1, No. 3,127–130 (1995) (no month).

Kees, et al.: "Compact stand–alone atomic force microscope, "*Rev. Sci.Instrum.*, vol. 64, No. 10, (1993) (no month).

Marti et al.: "Atomic force microscopy of liquid covered surfaces: atomic resolution images",*Appl.Phys.Let.*, vol. 51, No. 7 (1987).

Marti, et al.: "A atomic force micrscopy of an organic monolayer" *Science*, vol. 239 (1988) (no month).

Marti et al.: "Atomic resolution force microsopy of graphite and the 'native oxide'on silicon"*dept. of Physics, UCSB*, (1987) (no month).

Marti et al: "Atomic force microscopy and scanning tunneling micrscopy with combination atomic force microscope/ scanning tuneling microscope" *J.Vac.Sci.Technol.*, A6(3)(1988).

Marti et al.: "Control electronics for atomic force atomic force microscopy"*Rev.Sci.Instrum*, A6(3)(1988) (no month).

Mart et al.: "Probing surfaces with the atomic force microscope" *SPIE*, vol. 897 (1988) (no month).

Meyer et al.: "Erratum: Novel optical approach to atomic force microscopy" *Appl. Phys. Let.*vol.53 (1988) (no month).

Putman et al.: A theoretical comparison between interferometric and optical beam deflection technque for the measurement of cantilever dislacement in AFM *Ultramicroscopy*, pp. 1509–1513 (1992) (no month).

Putman et al: "Polymerized LB films imaged with a combined atomic force microscope–fluorescent microscope" *Langmuir.* vol. 8, pp. 3014–3019 (1992) (no month).

Putman et al.: "Immunogold labels: cell–surface markets in atomic forcw microscop", *Ultramicroscopy*, vol. 48, pp. 177–182 (1993) (no month).

Radmacher et al,: "An AFM with integrated micro fluorescence optics: design and performance"*Ultramicrscopy*, pp. 968–972 (1992) (no month ).

Ruger et al.: "Atomic force microsopy"*Physics Today* , (1990) (no month).

Walters et al.; "Atomic force microscope integrated with a scanning elctron microscope for tip fabrication"*App. Phys. Let.* , vol. 65 (1994) (no month).

Radmacher et al.: "Scanning nearfield optical microscope using microfabricated probes" *Rev.Sci.Instrum*, vol. 65 2737 (1988) (no month ).

ATOMIC FORCE MICROSCOPE FOR GENERATING A SMALL INCIDENT BEAM SPOT

This invention was made with government support under Grant No. DMR-9221781, awarded by the National Science Foundation and under Grant No. ONR-N000149310584, awarded by the Office of Naval Research. The government has certain rights in this invention.

BACKGROUND OF THE INVENTION

Optical detection in atomic force microscopy (AFM), such as with an optical lever or with an interferometric system, is a means of measuring the deflection of a cantilever caused by forces acting on it. Conventionally, cantilevers of 100–200 μm length with spring constants of 0.01–100 N/m are used to measure the surface properties of a sample. However, physical laws put lower limits on the achievable resolution and scan speed of these cantilevers. To get the best resolution measurements, one wants the cantilever tip to exert only a low force on the sample. In biology, for example, one often deals with samples that are so soft that forces above 10 pN can modify or damage the sample. This also holds true for high resolution measurements on 'hard' samples such as inorganic crystals, since higher forces have the effect of pushing the tip into the sample, increasing the interaction area and thus lowering the resolution. For a given deflection of the cantilever the force increases with the spring constant, k, of the cantilever. For general operation in fluid, small spring constants (<~1 N/m) are desirable. For operation in fluid on soft samples, practice has shown that spring constants <~0.1 N/m are desirable. For tapping mode in air, spring constants below 30 N/m are desirable.

A high resonant frequency, $f_R$, of the cantilever is required for rapid scanning and for low noise operation. The time it takes for a cantilever to respond after passing over a feature is of order $1/f_R$ for contact mode and $Q/f_r$ for tapping mode where Q is a quality factor for the cantilever. This sets a fundamental limit on scanning speed. The thermal noise of a cantilever involves fixed noise energy (of order kT) spread over a frequency range up to approximately the resonant frequency $f_R$ where k is the Boltzmann constant and T is the temperature in Kelvin Thus, the higher $f_R$, the lower the noise per unit band width below $f_R$. Higher resonant frequencies with low spring constants can be achieved by having smaller and thinner cantilevers. However, there are difficulties with using current AFMs with cantilevers significantly smaller than conventional ones. For optimal optical lever detection, the spot should substantially fill the cantilever. Underfilling results in a loss of optical lever detection efficiency because the reflected beam diverges more than necessary. Overfilling the lever means losing light and producing unwanted interference fringes due to light reflected off the sample. However, different operating requirements may be best met by different spot geometries even for the same cantilever. For example, for very low noise measurements of protein motion one may want to overfill the cantilever to achieve the best low noise operation, assuming one is not shot-noise limited, i.e., there is sufficient light intensity for the detector signal error to be within acceptable limits. For large-scale measurements on reflective samples one may want to underfill the cantilever to minimize interference effects from light reflected by the sample.

It is desirable to be able to use the AFM with its cantilever immersed in a fluid such as water; see for example U.S. Patent No. Re. 34,489: "Atomic Force Microscope With Optional Replaceable Fluid Cell," by Hansma et al wherein the cantilever probe is mounted to a module, which facilitates the formation of an annular seal to form a fluid cell around the cantilever probe. A plurality of cantilever tips can be on the same chip. Each of the cantilevers should be accessible to the optics of the system without undue manipulation to re-focus the system when shifting from one cantilever to another.

SUMMARY OF THE INVENTION

The present invention provides an AFM that meets the foregoing needs by generating a small incident beam spot. The AFM is provided with an optical system including a light source for producing a focused incident beam and means for directing the focused beam onto a cantilever to reflect therefrom to a detector. The system has a numerical aperture (NA) sufficient with the wavelength of the light from the light source whereby the focused beam forms a spot diameter, Wo, of 8 μm or less in at least one dimension. The spot diameter, $W_o$ in μm, is commonly defined as $2\times\lambda/(\pi\times NA)$ where λ=the wavelength in μm and NA is defined by $n\times\sin\theta$ where θ is ½ the angle of the far-field light cone (at the $1/e^2$ point) and n is the index of refraction (equal to 1 in air). For red light at λ=670 nm, NA should be greater than 0.05. For blue light at λ=400 nm, NA should be greater than 0.03. For ultraviolet light the minimum NA would be lower.

For red light, or even blue light, large numerical apertures of the focusing optics required by this invention results in a shallow depth of focus. The depth of focus of the incident beam spot can be defined as the range in which the beam spreads by 10% of the spot size. For example, if one requires a spot diameter of 2 μm and operates with light of 670 nm wavelength, the depth of focus is of the order of about 5 μm. As a result, with a plurality of adjacent cantilevers, one would have to check and possibly refocus the incident beam on each cantilever. Refocusing also may be necessary when replacing the chip on which the cantilevers are mounted. In accordance with the present invention, a confocal viewing system is implemented that has its focal plane at the same position as the focal plane of the incident light beam. By bringing the cantilever in focus in the viewing system, the incident light beam is automatically focused in the plane of the cantilever. By adjusting until the line of focus on the sample is normal to the cantilever, one can assure that the cantilever chip is parallel to the sample, thereby preventing interference of the chip with the sample. The AFM of this invention can utilize a plurality of adjacent cantilevers on the same chip; the focus of the incident beam is shifted from one cantilever to another while remaining substantially in focus with each cantilever. Chips with parallel cantilevers are commercially available.

In addition to causing a shallow depth of focus, optical access problems arise from the large opening angle of the incident beam used to achieve a high numerical aperture. To avoid complex lens systems or an accumulation of lenses in close proximity to the cantilever, the incident and reflected light beams may be arranged so that they overlap and are taken through the same lens system. The incident and reflected light beams are separated by polarization using a beamsplitter in conjunction with a quarterwave plate, a concept well-known in interferometry; e.g., see D. Rugar et al., *Review of Scientific Instruments*, 59, 2337–2340 (1988). Because the lens system of this invention is compact, it may be mounted directly on the cantilever module. In addition, piezoelectric elements can be located in the cantilever module support for tapping mode AFM operation.

The present invention will be described with respect to particular embodiments, but modifications can be made in keeping with the inventive concepts. For example, while a position sensitive detector will be referred to, one could alternatively utilize other detection means such as an interferometric detector. In such case, the numerical aperture would be based on the optics of the interferometric system. Components other than the detector could be essentially the same.

BRIEF DESCRIPTION OF THE DRAWINGS

The following briefly describes each of the drawings, in which some components, particularly the cantilever and its scanning probe tip, is greatly exaggerated for clarity of illustration.

DETAILED DESCRIPTION

The present invention has its best utility with respect to what we refer to here as "small cantilevers" generally having a size below 30 $\mu$m to as small as 4 $\mu$m in length, or even smaller if achievable. Although developed for such small cantilevers, the invention can also be used with intermediate cantilevers defined herein as having a length greater than 30 $\mu$m and less than 100 $\mu$m, as well as with conventional cantilevers which generally have a size range from 100 to 200 $\mu$m in length.

Figure 1:
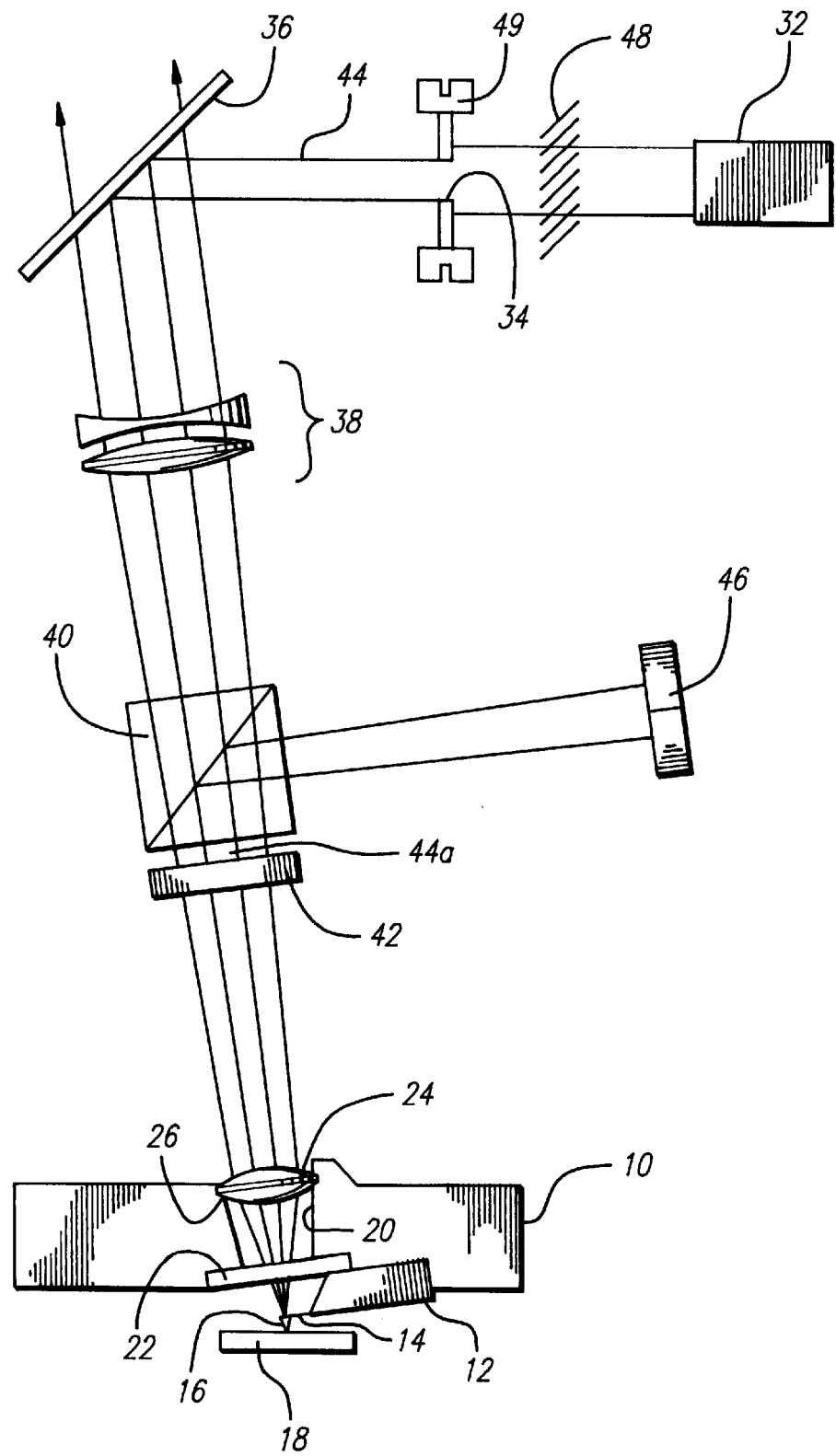
FIG. 1 is a schematic drawing of an atomic force microscope of the present invention.

Referring to FIG. 1 a cantilever module 10 is shown in which a cantilever chip 12 is secured and on which a cantilever 14 is microfabricated having its probe tip 16 in contact or near contact with the surface of a sample 18. The module 10 includes a medial opening 20 in which is mounted a window 22 in the lower region thereof. The window 22, which can be a cover glass, forms the boundary to the sample environment. The window 22 can be replaced by another lens that acts in conjunction with the other lenses to focus the incident beam. A lower focusing lens 24 is secured by having its edges inserted in a retaining groove 26. The lower focusing lens 24 is a component of an optical lever system which includes a collimated light source 32, an aperture 34, an incident light beamsplitter 36, a movable lens system 38, a polarizing beamsplitter 40, and a quarterwave plate 42. The lower focusing lens 24 is preferably secured to the module 10 in close proximity to the cantilever 14 to facilitate a large numerical aperture. The components shown in FIG. 1 and associated housing can be referred to as the system's head.

The collimated light source 32 can be a laser or a superradiant diode that produces an incident beam 44. In a particular embodiment, the collimated light source is a 670 nm wavelength laser diode, coupled to a single mode optical fiber wherein the light beam is collimated upon exit. The incident beam 44 passes through the aperture 34 and is directed toward the cantilever 14 by the beamsplitter 36. The incident beam 44 then passes through the movable lens system 38 and through the polarizing beamsplitter 40 that passes only one polarization direction of the laser light of the incident beam. The other polarization direction is reflected onto one side of the head, away from a photodetector 46, where it hits a black body (not shown) that minimizes stray light. Unwanted stray light can optionally be reduced by mounting a polarizer 48 into the beam outside of the head's cavity, to filter out the direction of polarization that will be reflected by the polarizing beam splitter 40.

The detector can be of conventional structure. To facilitate centering the beam on the detectors, an X-Y positioning stage (not shown) as known, can be used. Additionally, the tilt of the detector can be adjusted by a tilt stage or by adding a tilt component to the X-Y stage.

That portion 44a of the incident light beam 44 that passes through the polarizing beamsplitter is transmitted through the quarterwave plate 42 where it becomes elliptically polarized. The incident beam then passes through the focusing lens 24, through the window 22 and hits the top surface of the cantilever 14 from where it is reflected. The reflected beam passes back through the same window 22, focusing lens 24 and quarterwave plate 42. The quarterwave plate now linearly polarizes the reflected beam, the resulting beam having a polarization perpendicular to that of the incident beam. This causes the beam reflected by the cantilever 14 to be almost completely reflected by the beamsplitter 40 onto the detector 46. Such differential polarization, using a beam splitter and quarterwave plate is well-known as is the required orientation of the components. The amount of reflected light that passes through the beamsplitter 40 is generally sufficient for viewing, as will be discussed below.

As shown in FIG. 1, the optical axis of the incident beam 44 is tilted from the vertical so that the incident beam is normal to the plane of the cantilever 14. This has several advantages. For example, light lost by shadowing on the edge of the chip 12 is minimized. This is especially important for the high numerical aperture systems that are necessary for the small spot sizes of the present invention, because a cone of light with a large opening angle must reach the cantilever.

Figure 2:
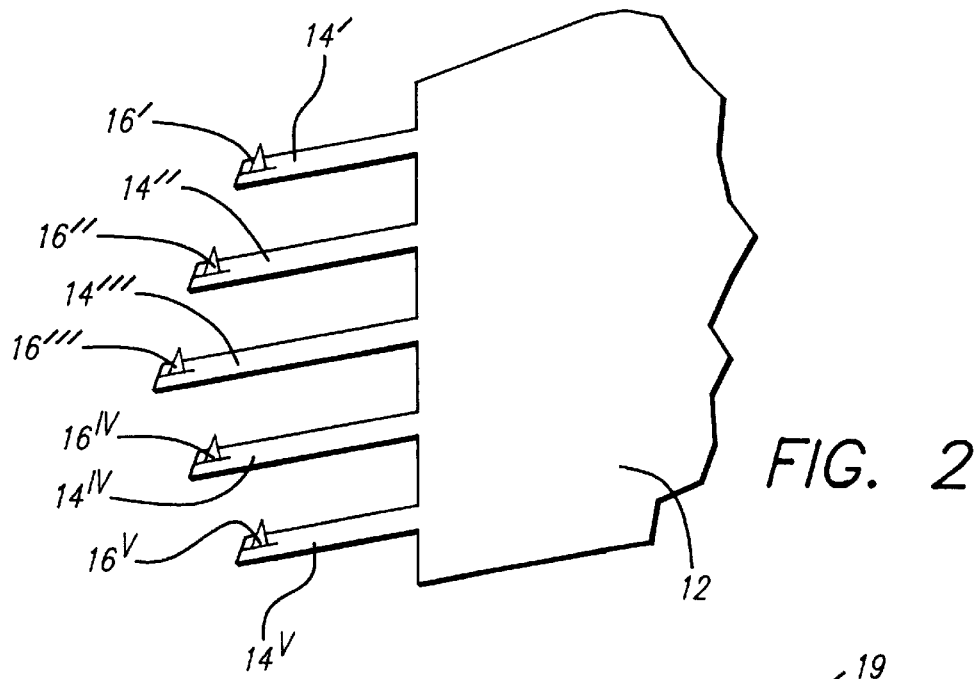
FIG. 2 is a bottom perspective view of a silicon nitride cantilever chip.

Overlapping the incident and reflected beams enables one to conveniently place the plane of the cantilever in the plane of focus. Accordingly, one can focus on the cantilever and then move the spot on the cantilever without having to refocus. With adjacent cantilevers, one can focus on one cantilever and then shift the focus of the incident beam from one cantilever to another, for example by shifting the beam. The incident beam will be substantially in focus with each cantilever, requiring only minor adjustment, if any. A chip having a plurality of cantilevers $14^1$, $14^{11}$, $14^{111}$, $14^{1v}$ and $14^v$, of varying lengths, is shown in FIG. 2, viewed from the bottom to show their tips, respectively at $16^1$, $16^{11}$, $16^{111}$, $16^{1v}$ and $16^v$.

By sharing optical components, a confocal viewing system is readily obtained and is helpful for focusing the incident beam onto a spot on the cantilever and for positioning the spot. The fact that the incident beam is collimated before hitting the first lens 38 requires infinity-corrected optics for the viewing system to be confocal with the incident beam. In a particular embodiment, a telescope focused at infinity (not shown) is used. In another embodiment a video system is used; the video camera needs to be focused at infinty only if collimated light is used. If one adjusts the movable lens system 38 such that the cantilever appears in focus in the viewing system, then, automatically, the incident beam 44a will be focused in the plane of the cantilever. This is a convenient adjustment for operating with small cantilevers. At the same time, the spot from the incident beam can be seen in the viewing system, reduced in intensity by the polarizing beamsplitter 40, and can be positioned accurately on the cantilever.

Alternatively, the detector 46 can be used to measure the intensity of the reflected beam and the movable system 38 could be adjusted so as to maximize the intensity. This would serve to quickly focus the beam on the cantilever. Also, by mounting the quarter wavelength plate so that it can be rotated, one can obtain varying intensities of the light for specific purposes.

Non-infinity corrected optics can be used as long as the movable lens system 38 is equivalent for both the incident beam and the viewing system and a one-time lens adjustment is done to match both focal planes. This adjustment is easiest with infinity-corrected optics, but it can be done for other systems such as with a 45 mm microscope objective and a 160 mm tube length to give a 205 mm system.

The viewing system can help with the course approach of the sample. A line on the sample will come into focus as the sample approaches the cantilever. This line is the intersection of the plane of focus of the viewing system with the plane of the sample. If the plane of focus of the viewing system is substantially the same as the plane of focus of the cantilever 14 then, as the sample approaches, the line of focus on the sample will be observed to approach the cantilever 14. Experience will guide the user in how close to bring the line of focus on the sample to the cantilever before turning over the approach to conventional line approach systems.

Figure 3:
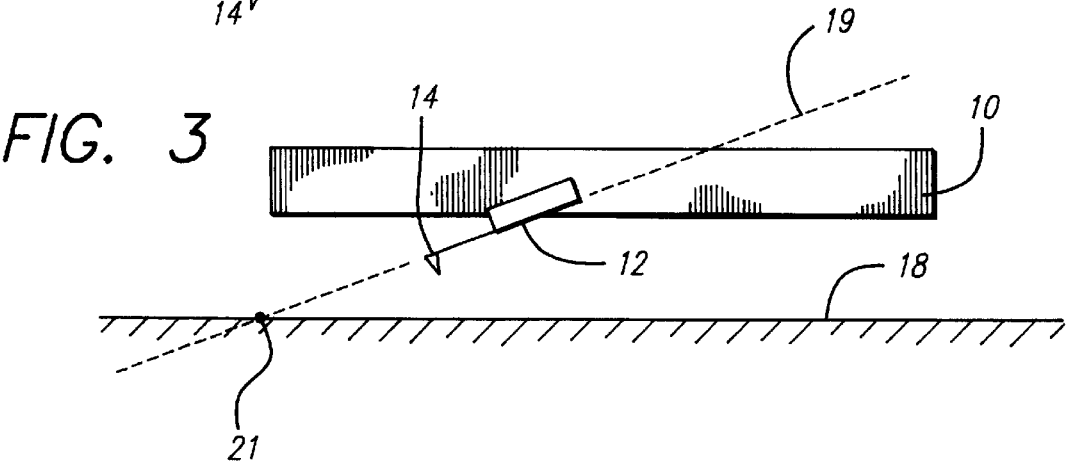
FIGS. 3 and 4 are schematic representations of the relationship between the cantilever chip and cantilever, the plane of focus of the viewing system and a line of focus seen in the viewing system.
Figure 4:
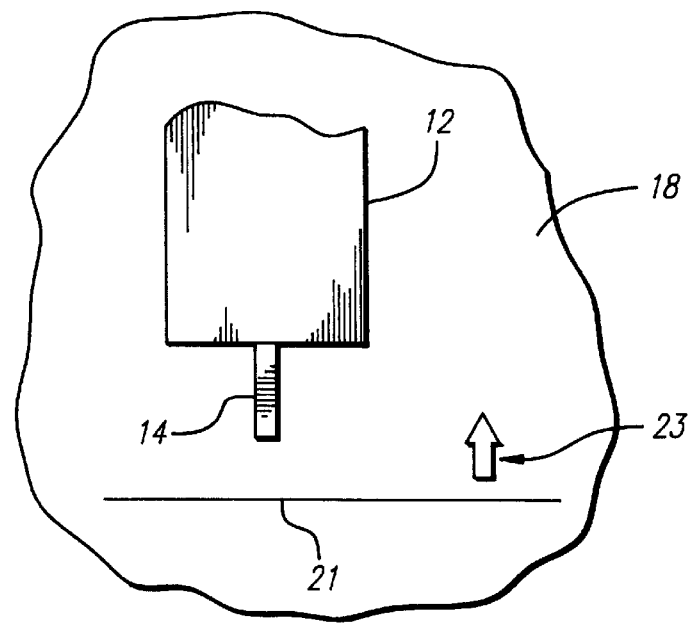

In order to assure that the edge of the cantilever chip 12 does not contact the sample 18 (which could be a result if the cantilever module is not parallel to the sample), the above line of focus can be adjusted so as to be parallel to the edge of the cantilever chip 12. Adjustment that results in a parallel line of focus will adjust the angle of the chip to be parallel to the sample. This is illustrated in FIGS. 3 through 6. As shown in FIGS. 3 and 4, the cantilever module 10 is parallel with the sample 18 and the plane of focus of the viewing system, indicated by the dashed line 19, is coincident with the plane of the cantilever 14. What appears as a line of focus 21 in the viewing system is seen in FIG. 3 as a point that extends normal to the drawing sheet. When moving the sample 18 up (toward the cantilever 14), this line 21 approaches the cantilever 14 in the viewing system, as shown by the arrow 23.

Figure 5A:
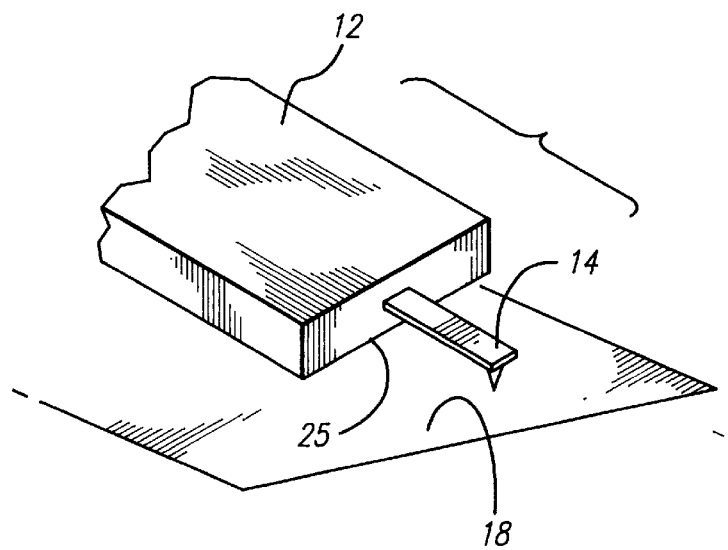
FIGS. 5a and 5b are schematic representations of the interaction of FIGS. 3 and 4 with a cantilever chip tilted relative to the plane of the sample.
Figure 5B:
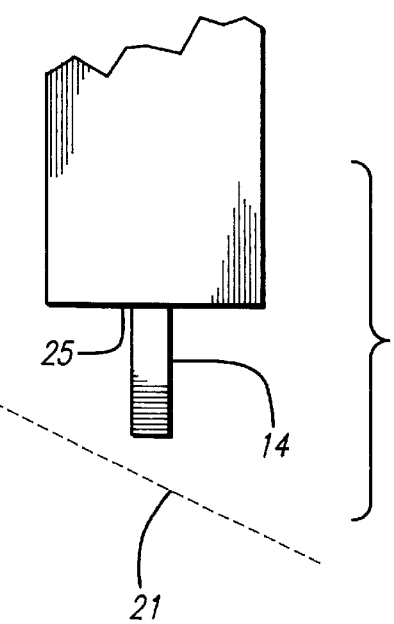

Referring to FIGS. 5a and 5b, when the front edge 25 of the chip 12 is tilted relative to the plane of the sample 18, a corner of the chip 12 could hit the sample 18 before the cantilever 14 contacts the sample 18. To avoid this, the user straightens out the line of focus 21 on the sample 18 while the cantilever 14 is in focus, before and during engagement of the cantilever 14 with the sample 18.

Figure 6A:
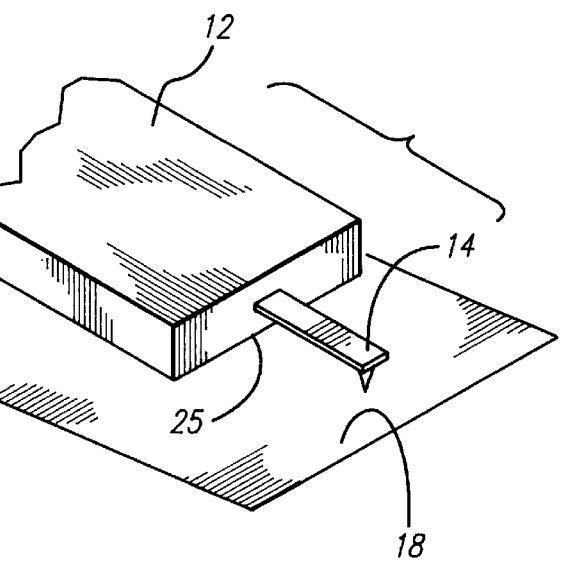
FIGS. 6a and 6b are schematic representations of the interaction of FIGS. 3 and 4 with a chip that is parallel to the sample.
Figure 6B:
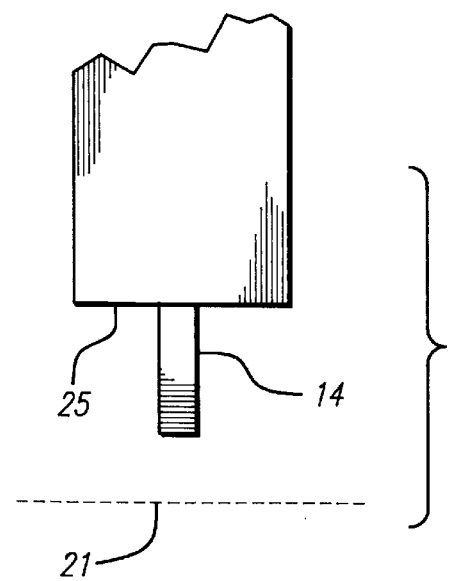

Referring to FIGS. 6a and 6b, with the front edge 25 of the chip 12 parallel to the plane of the sample 18, when the cantilever 14 is in focus, the line of focus 21 on the sample 18 will be normal to the cantilever 14.

Still referring to FIG. 1, in a further embodiment of the invention, an adjustable aperture 49 is placed in the incident path to tailor the spot geometry to the cantilever. For example, one could use the mechanism that controls camera apertures formed with overlapping plates. One can use a non-circular spot by selectively choosing the geometry of the closing plates, or by substituting pre-formed aperture-plates. The user would focus the viewing system on the cantilever and then would adjust the spot position, size and shape. Accordingly, long and conventional cantilevers could be run as well as short and exotic ones, all with optimal performance. For example, one can include a rectangular 2 mm by 4 mm aperture (or, equivalently, two slit apertures at right angles to each other with lengths of 2 mm and 4 mm, respectively) with a lens system that had a numerical aperture of 0.2 when filled with a 6 mm diameter beam ($\lambda$=670 nm). This would give a spot size of about 6 $\mu$m by 3 $\mu$m which would approximately fill a cantilever that was 6 $\mu$m long and 3 $\mu$m wide.

In another particular implementation, a cantilever having a length, width and thickness, respectively of 4 $\mu$m, 2 $\mu$m and 0.05 $\mu$m can be made from, for example, aluminum with a spring constant of about 0.1 N/m and a resonant frequency of approximately 2.6 MHz. If one wants a spot diameter of 2 $\mu$m with 670 nm wavelength light, the depth of focus would be on the order of 5 $\mu$m. A small size cantilever which can be used with the present invention includes a cantilever made of silicon nitride on which gold has been deposited with a length, width and thickness, respectively, of 23 $\mu$m, 12 $\mu$m, and 0.44 $\mu$m. An intermediate size cantilever on which the invention has been used, also constructed of gold deposited silicon nitride, has a length, width and thickness, respectively of 78 $\mu$m, 20 $\mu$m and 0.44 $\mu$m. A spot size of 7 $\mu$m with a depth of focus of the order of 50 $\mu$m has been used.

Figure 7:
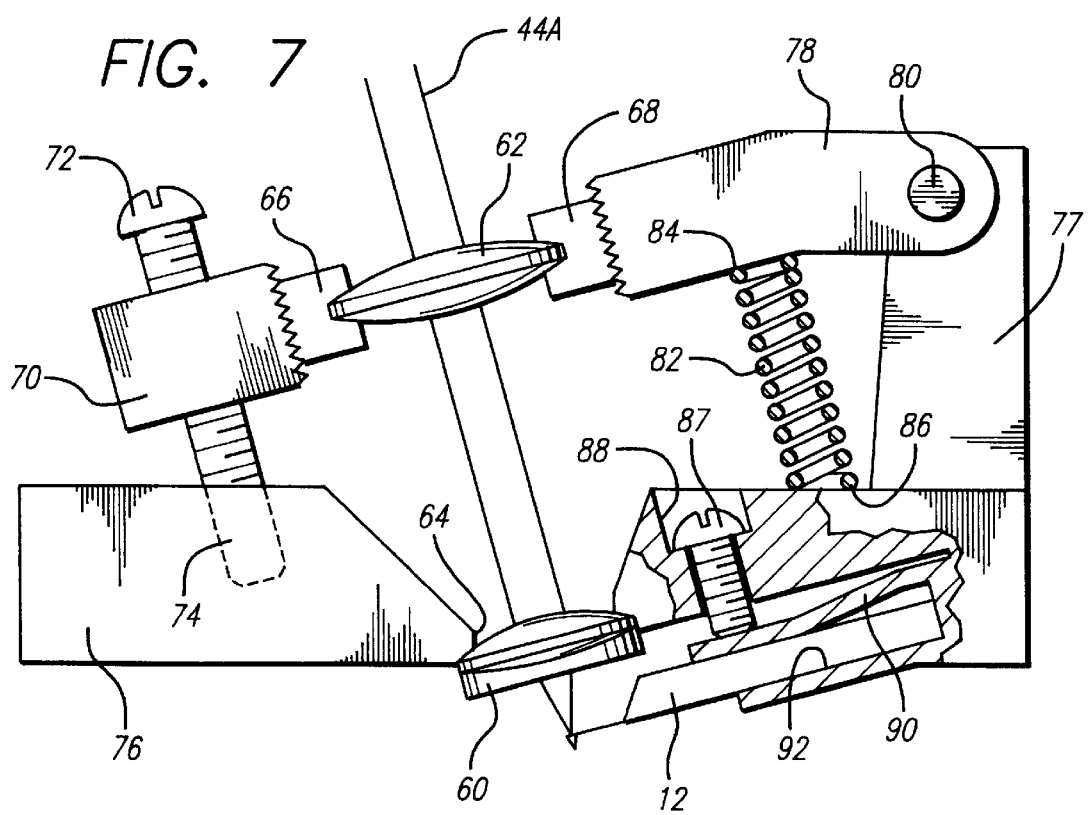
FIG. 7 is a schematic drawing of a cantilever module in another embodiment of this invention in which a lens for the confocal viewing system is movably mounted to the module.

Another method of moving the lens assembly is shown in FIG. 7. The lens assembly has a lower fixed lens 60 and an upper translatable lens 62. The lower assembly lens 60 is fixed in a lower region of the module in a central opening 64. The upper assembly lens 62 is secured to a fixture 66 mounted to a member 70 which has a threaded opening on one side that interacts with a bolt 72, secured in a bolt hole 74 located in the module 76. The other side of the member 70 defines an arm region 78 pivotally secured at 80 to an upright 77 that is secured to the upper surface of the module 76. A spring 82 is secured to the arm region 78 at 84 and to the upper surface of the module at 86. By turning the bolt 72 in one direction or the other, the threadable member 70 can raise or lower the assembly upper lens 62. One can then determine when the cantilever is in focus by observation through the confocal viewing system.

Also shown in FIG. 7 is a convenient mechanism for removing and replacing the cantilever chip 12. A bolt 87 in a bolt hole 88 presses against a deflectable member 90 which in turn impinges on the cantilever chip 12 which is located in a pocket 92 to clamp the cantilever to the module 76. By such means, the cantilever chip can be readily released or secured to the module and can be positioned forward and aft.

Figure 8:
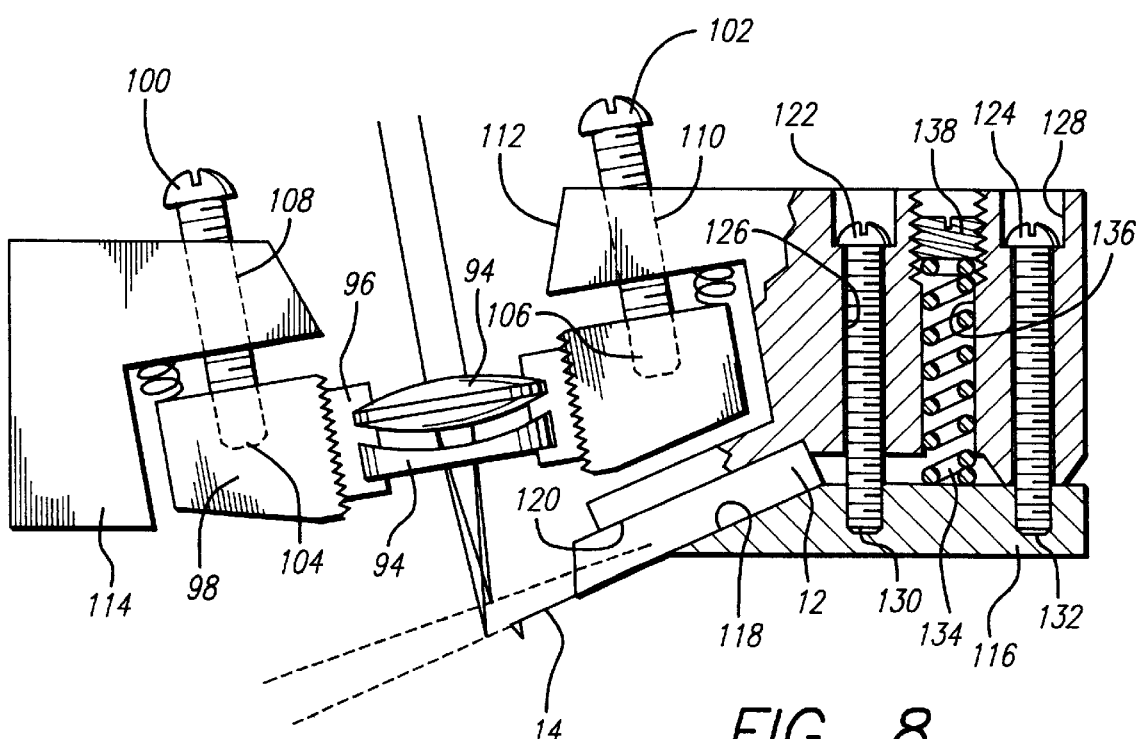
FIG. 8 is a schematic drawing of a cantilever module in another embodiment of this invention in which the focusing lens is contained within a mechanism mounted on the module for tilting the lens to adjust the line of focus of the incident beam.

As indicated above, by having the optical axis of the focusing lenses perpendicular to the plane of the cantilever, the plane of focus of the incident beam 44a will be parallel to the plane of the cantilever. Causing the focus of the incident beam to be parallel to the plane of the cantilever can also be accomplished by tilting the lenses, as in view camera photography. Referring to FIG. 8, a lower lens assembly 94 is secured in a central opening 96 in a threadable lens holder 98 which is secured by bolts 100 and 102 acting in respective bolt holes 104 and 106. The bolts are threaded through threaded openings 108 and 110 on opposite sides of a central opening 112 in the module 114. A third bolt (not shown) is out of the drawing sheet but is similarly disposed in a corresponding threaded opening through the module 114 and lens holder 98. The opening 96 in the lens holder 98 is threaded so that the lens 94 can be moved upwardly and downwardly therein when making course adjustment. By inwardly or outwardly threading one or more of the bolts 100, the lens 94 can be tilted with respect to the cantilever 14.

Also shown in FIG. 8 is still another method for securing the cantilever chip 12. In this case, a lower plate 116 is secured to the lower surface of the module 114 and clamps the cantilever chip 12 between its planed surface 118 and the corresponding oblique surface of the module 120 by means of bolts 122 and 124 through holes 126 and 128 in the module and corresponding holes 130 and 132 in the plate 116. A spring 134 located in another hole 136 in the module is loaded by means of a bolt head 138 threaded in the top of the module and bearing against the spring 134, to facilitate release.

Figure 9:
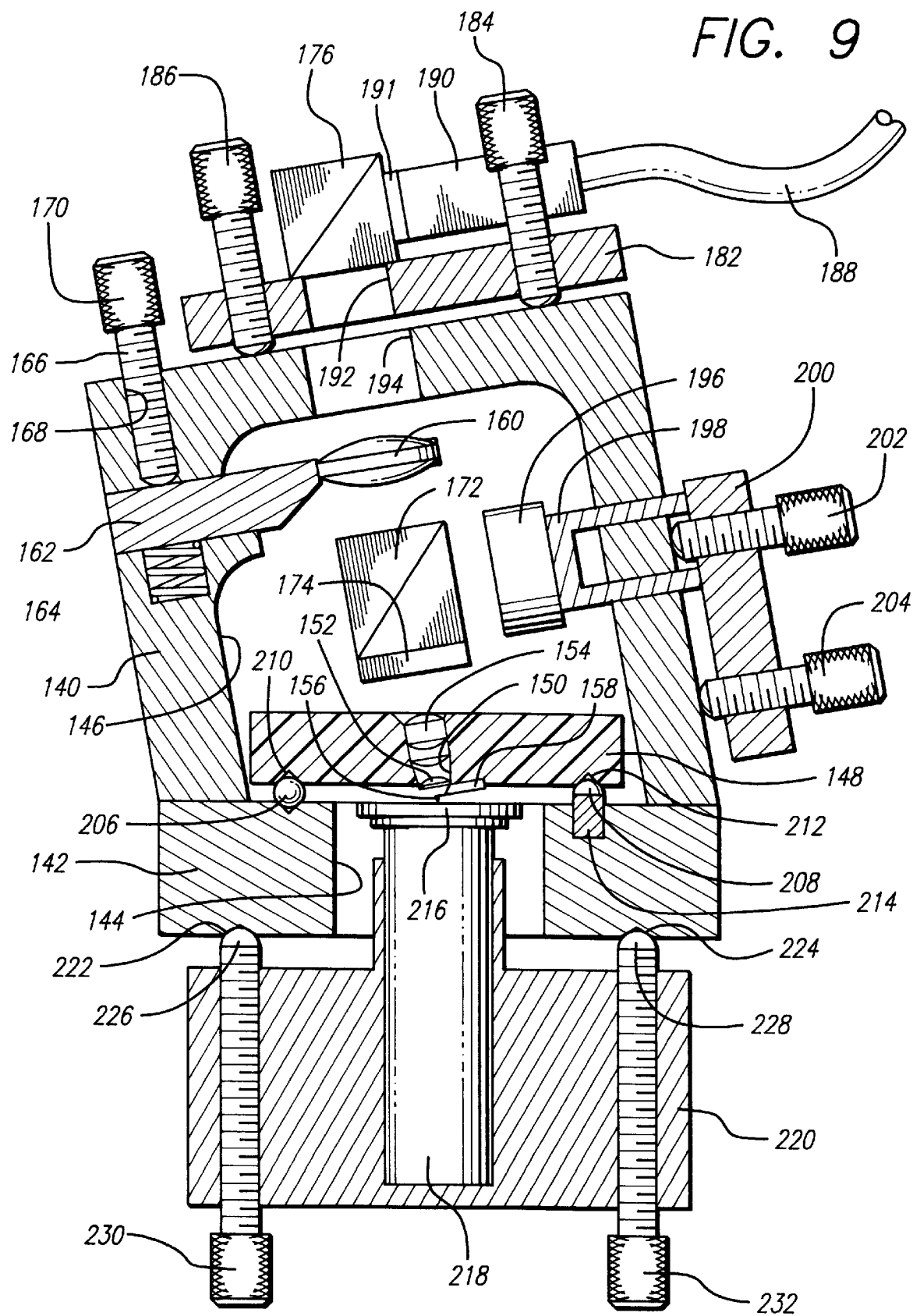
FIG. 9 is a schematic layout drawing of an atomic force microscope of another embodiment of this invention in which the module is supported on a piezoelectric element for tapping mode operation.

A general layout of another embodiment is shown in FIG. 9. The microscope is compact, formed from an aluminum block housing 140 carried on a base plate 142 which has a central opening 144. The housing 140 defines a cavity 146 in which is disposed a cantilever module 148. The module 148 is formed with a medial opening 150 in which a lower lens 152 and upper lens assembly 154 are fixed above a cantilever 156 carried on a cantilever chip 158 which is secured to the bottom of the module 148. The housing 140 supports a movable lens 160 carried by a lens holder 162 which is movable against a spring 164 by a bolt 166 threadably carried in a bolthole 168 in the block 140 and turned against the bias of the spring 164 by a focus knob 170. A polarizing beam splitter 172, above and integral with a quarterwave plate 174 is supported in the path of the light, between the movable lens 160 and the upper lens assembly 154. The beamsplitter 176 is supported on a tiltstage 182 which includes two adjustment screws 184 and 186 and a pivot point (not shown).

Light from an optical fiber 188 goes through a collimator 190 to be directed by the incident light beamsplitter 176 through openings 192 and 194, respectively, in the tiltstage 182 and block 140. The forward end of the collimator 190 abuts a slit 191 into which can be placed a plate having an aperture opening shaped as desired. The tiltstage 182 positions the focused spot on the cantilever 156. Collimated light from the incident beam splitter 176 travels through the movable lens 160, polarizing beam splitter 172, quarterwave plate 174 and fixed lenses 154 and 152 to impinge on the top side of the cantilever 156.

Light reflected from the cantilever travels back through the fixed lenses 152 and 154, through the quarterwave plate 174 and is reflected by the beamsplitter 172.

A detector 196 is positioned in the block cavity 146 and is carried by an arm 198 connected to a detector tiltstage 200 which, by means of adjustment screws two of which, 202 and 204, are shown, centers the reflected beam onto the detector 196.

The cantilever module 148 is carried on the base plate 142 by a steel ball 206 on one side and by a steel hemisphere 208 on the other side, and which are located by cavities, respectively 210 and 212 formed in the bottom of the cantilever module 148. The steel hemisphere 208 is glued to a z-directional tapping piezoelectric actuator 214 which has wires (not shown) leading to a control (not shown) to enable a tapping mode to the cantilever operation. Such placement of the tapping piezoelectric actuator 214 simplifies construction of the device and can replace the piezoelectric tapping actuator located, for example, in the fluid cell. Alternatively, a piezoelectric actuator can be located under each ball supporting the cantilever module.

The sample 216 is supported on a piezoelectric scan tube 218 carried in a scanner assembly 220. The scan tube 218 is of conventional design well-known in the art whereby application of x-, y-, and z-directional voltages over wires (not shown) moves the sample horizontally and vertically. The base plate 142 is supported on the scanner assembly 220 by means of locating cavities 222 and 224 which interface with steel balls, respectively, 226 and 228 carried on adjustment screws, respectively, 230 and 232.

We claim:

1. In an atomic force microscope including at least one cantilever mounted therein and an optical detector, the improvement, for generating a small incident beam spot, comprising:

an optical system including a light source and means for producing an incident beam, and at least one lens for focusing said incident beam; and means for directing said focused incident beam onto said cantilever to reflect therefrom to said detector;

said optical system having a numerical aperture sufficient with the wavelength of light from said light source whereby said focused beam forms a spot on said cantilever having a size of 8 $\mu$m or less in at least one dimension.

2. The atomic force microscope of claim 1 in which the components of said optical system are arranged so that at least portions of said incident and reflected beams overlap, and including means for separating said reflected beam from said incident beam and directing said separated reflected beam to said detector.

3. The atomic force microscope of claim 2 in which said separating means comprises a polarizing beamsplitter in the path of said incident and reflected beams arranged to pass light having a first polarization direction and to reflect light having a second polarization direction, and including means located between said beamsplitter and said cantilever, in the path of said overlapping beams, for converting at least a portion of said reflected light beam into said second polarization direction.

4. The atomic force microscope of claim 3 in which said converting means comprises a quarterwave plate that elliptically polarizes the incident beam and linearly polarizes the reflected beam.

5. The atomic force microscope of claim 2 including a polarizer in the path of said incident beam but outside the path of said overlapping beams arranged to pass light having substantially only a first polarization direction, said separating means comprising a beamsplitter in the path of said incident and reflected beams arranged to pass light having said first polarization direction and to reflect light having a second polarization direction and means located between said beamsplitter and said cantilever, in the path of said overlapping beams, for converting at least a portion of said reflected light beam into said second polarization direction.

6. The atomic force microscope of claim 5 in which said converting means comprises a quarterwave plate that elliptically polarizes the incident beam and linearly polarizes the reflected beam.

7. The atomic force microscope of claim 1 including means for disposing the plane of the focus of the incident beam coincident with the plane of said cantilever.

8. The atomic force microscope of claim 7 in which said focus plane disposing means comprises at least one focusing lens disposed to focus said incident beam onto said cantilever and means for tilting said focusing lens until the plane of focus thereof is coincident with the plane of the cantilever.

9. The atomic force microscope of claim 7 in which said focus plane disposing means comprises at least one focusing lens disposed to focus said incident beam onto said cantilever, the optical axis thereof being disposed to be perpendicular to the plane of said cantilever.

10. The atomic force microscope of claim 1 having a plurality of cantilevers and including means for shifting the focus spot of said incident beam from one cantilever to another and means for disposing the plane of the focus of the incident beam coincident with the plane of at least one of said plurality of cantilevers whereby said incident beam will be substantially in focus with the cantilever to which the focus spot has been shifted.

11. The atomic force microscope of claim 1 having removably mounted therein a module to which said cantilever is mounted, and including a focusing lens mounted on said module and focusing said incident beam to a spot on said cantilever.

12. The atomic force microscope of claim 1 including at least one tapping piezoelectric element, said module being supported thereon to facilitate tapping mode operation.

13. The atomic force microscope of claim 12 in which said module is disposed on a support, said tapping piezoelectric element being embedded in said support.

14. The atomic force microscope of claim 1 in which the wavelength of light from said light source is 670 nm and said numerical aperture is greater than 0.05.

15. In an atomic force microscope of including at least one cantilever mounted therein and an optical detector, the improvement, for generating a small incident beam spot, comprising:

an optical system including a light source and means for producing a focused incident beam;

means for directing said focused incident beam onto said cantilever to reflect therefrom to said detector;

means for defining an aperture in the path of said incident beam; and means for adjusting the size of said aperture whereby to control the size of said incident beam spot on said cantilever;

said optical system having a numerical aperture sufficient with the wavelength of light from said light source whereby said focused beam forms a spot on said cantilever having a size of 8 $\mu$m or less in at least one dimension.

16. In an atomic force microscope of including at least one cantilever mounted therein and an optical detector, the improvement, for generating a small incident beam spot, comprising:

an optical system including a light source and means for producing a focused incident beam;

means for directing said focused incident beam onto said cantilever to reflect therefrom to said detector;

means for defining an aperture in the path of said incident beam; and means for adjusting the shape of said aperture whereby to control the shape of said incident beam spot on said cantilever;

said optical system having a numerical aperture sufficient with the wavelength of light from said light source whereby said focused beam forms a spot on said cantilever having a size of 8 $\mu$m or less in at least one dimension.

17. In an atomic force microscope including at least one cantilever mounted therein and an optical detector, the improvement, for generating a small incident beam spot, comprising:

an optical system including a light source and means for producing a focused incident beam;

a lens disposed to focus said incident beam normal to said cantilever to a spot on said cantilever; and means confocal with said lens for viewing the location of said spot;

said optical system having a numerical aperture sufficient with the wavelength of light from said light source whereby said focused beam forms a spot on said cantilever having a size of 8 $\mu$m or less in at least one dimension.

18. The atomic force microscope of claim 17 in which at least portions of said incident and reflected beams and said viewing means share a common optical path.

19. The atomic force microscope of claim 18 in which said light source is a source of collimated light and the optics of said viewing means is infinity-corrected.

20. The atomic force microscope of claim 18 in which said viewing means includes a translatable lens in said common optical path whereby translation thereof to focus the image of the cantilever in the viewing means results in focusing the incident beam in the plane of the cantilever.

21. In an atomic force microscope including at least one cantilever mounted therein and an optical detector, the improvement, for generating a small incident beam spot, comprising:

an optical system, including:

a collimated light source for producing an incident beam, means for defining an aperture in the path of said incident beam, means for adjusting the size of said aperture whereby to control the size of at least one dimension of said incident beam, a focusing lens disposed to focus said incident beam to produce a focused incident beam, means for directing said focused incident beam onto said cantilever to reflect therefrom to said detector, at least portions of said incident and reflected beams overlapping, said optical system having a numerical aperture sufficient with the wavelength of light from said light source whereby said focused beam forms a spot on said cantilever having a size of 8 $\mu$m or less in at least said one dimension, means for separating said reflected beam from said incident beam whereby to direct said separated reflected beam to said detector, comprising a polarizing beamsplitter in the path of said incident and reflected beams arranged to pass light having a first polarization direction and to reflect light having a second polarization direction, and a quarterwave plate located between said beamsplitter and said cantilever in the path of said overlapping beams, for elliptically polarizing said incident beam and linearly polarizing said reflected beam, whereby to impart said second polarization direction to said reflected beam;

viewing means confocal with said focusing lens and sharing a common path with said overlapping incident and reflected beams for viewing the location of said spot on said cantilever;

a translatable lens in said common optical path for focusing the image of the cantilever in said viewing means, the optical axis of said translatable lens and focusing lens being disposed to be perpendicular to the plane of said cantilever whereby to focus the incident beam in the plane of said cantilever;

a removably mounted module to which said cantilever is mounted, said focusing lens being mounted on said module; and at least one tapping mode piezoelectric element, said module being supported thereon.

22. The atomic force microscope of claim 21 in which the wavelength of light from said light source is 670 nm and said numerical aperture is greater than 0.05.

23. In an atomic force microscope:

an optical detector;

a cantilever having a length of less than 30 $\mu$m;

an optical system including a light source and means for producing a focused incident beam; and means for directing said focused incident beam onto said cantilever to reflect therefrom to said detector;

said optical system having a numerical aperture sufficient with the wavelength of light from said light source whereby said focused beam forms a spot on said cantilever having a size of 8 $\mu$m or less in at least one dimension.

* * * * *

UNITED STATES PATENT AND TRADEMARK OFFICE
CERTIFICATE OF CORRECTION

PATENT NO. : 5,825,020
DATED : October 20, 1998
INVENTOR(S) : Paul K. Hansma et al.

It is certified that error appears in the above-identified patent and that said Letters Patent is hereby corrected as shown below:

Column 1, line 38, delete "$Q/f_r$" and insert --$Q/f_R$--
Column 1, line 44, after "Kelvin" insert --.--

Signed and Sealed this

Twenty-second Day of June, 1999

*Attest:*

Q. TODD DICKINSON

*Attesting Officer*    *Acting Commissioner of Patents and Trademarks*

(12) EX PARTE REEXAMINATION CERTIFICATE (7907th)
United States Patent
Hansma et al.

(10) Number: US 5,825,020 C1
(45) Certificate Issued: Dec. 7, 2010

(54) ATOMIC FORCE MICROSCOPE FOR GENERATING A SMALL INCIDENT BEAM SPOT

(75) Inventors: Paul K. Hansma, Goleta, CA (US); Tilman E. Schaffer, Santa Barbara, CA (US); Jason P. Cleveland, Ventura, CA (US)

(73) Assignee: National Science Foundation, Arlington, VA (US)

Reexamination Request:
No. 90/009,214, Jul. 3, 2008

Reexamination Certificate for:
Patent No.: 5,825,020
Issued: Oct. 20, 1998
Appl. No.: 08/709,349
Filed: Sep. 6, 1996

Certificate of Correction issued Jun. 22, 1999.

(51) Int. Cl.
*G01B 7/34* (2006.01)
*G01B 5/28* (2006.01)
*G01B 21/30* (2006.01)
*G01B 5/20* (2006.01)
*H01J 3/14* (2006.01)
*H01J 3/00* (2006.01)
*G01N 13/16* (2006.01)
*G01N 13/10* (2006.01)

(52) U.S. Cl. .......................... 250/216; 250/234; 73/105; 850/38; 850/40; 977/870

(58) Field of Classification Search .................. None
See application file for complete search history.

(56) References Cited

U.S. PATENT DOCUMENTS 5,144,833 A 9/1992 Amer et al. .................... 73/105
5,157,251 A 10/1992 Albrecht et al.
5,247,186 A 9/1993 Toda .......................... 250/561
5,406,832 A 4/1995 Gamble et al. ................. 73/105

FOREIGN PATENT DOCUMENTS

JP 5-79834 A 3/1993

OTHER PUBLICATIONS

Erlandsson, R. et al. (Mar./Apr. 1988). "Atomic Force Microscopy Using Optical Interferometry," *Journal of Vacuum Science & Technology A: Vacuum, Surfaces, and Films* 6(2) 266–270.
Mamin, H.J. et al. (May 30, 1995). "Tip–Based Data Storage Using Micromechanical Cantilevers," *Sensors and Actuators A* 48(3):215–219.

*Primary Examiner*—Albert J Gagliardi

(57) ABSTRACT

An atomic force microscope utilizing an optical system having a numerical aperture sufficient with the wavelength of light of an incident beam to form a spot on the cantilever having a size of 8 μm or less in at least one dimension. An adjustable aperture can be utilized to control the size and/or shape of the incident beam spot on the cantilever. Portions of the incident beam and the beam reflected from the cantilever overlap and are directed so that the plane of focus of the incident beam is parallel to the plane of the cantilever. The incident and reflected light beams are separated by polarization using a beamsplitter in conjuction with a quarterwave plate. Focussing can be accomplished with a confocal viewing system coupled with a translatable focusing lens common to the optical system and viewing system. The atomic force microscope enables use with a plurality of cantilevers on the same chip wherein the focus of the incident beam is shifted from one cantilever to another while remaining substantially in focus. One of the focusing lenses can be mounted in close proximity to the cantilever to provide a high numerical aperture. An optional adjustable lens can also be mounted on the module. A piezoelectric tapping element can be embedded in a base plate of the cantilever module for tapping mode AFM.

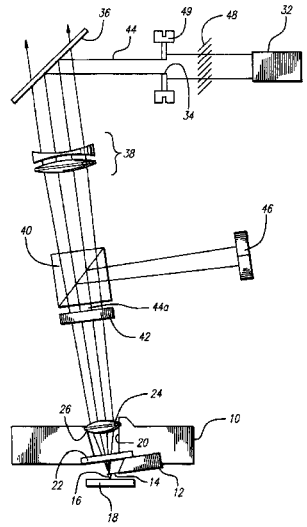

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3-6 is confirmed.

Claims 1-2 are cancelled.

Claims 7, 14, 15, 16 and 23 are determined to be patentable as amended.

Claims 8 and 9, dependent on an amended claim, are determined to be patentable.

New claim 24 is added and determined to be patentable.

Claims 10-13 and 17-22 were not reexamined.

7. The atomic force microscope of claim [1] *24* including means for disposing the plane of the focus of the incident beam coincident with the plane of said cantilever.

14. The atomic force microscope of claim [1] *24* in which the wavelength of light from said light source is 670 nm and said numerical aperture is greater than 0.05.

15. In an atomic force microscope of including at least one cantilever mounted therein and an optical detector, the improvement, for generating a small incident beam spot, comprising:
  an optical system including a light source and means for producing a *beam of light consisting essentially of a single beam, which forms said* focused incident beam;
  means for directing said focused incident beam onto said cantilever to reflect therefrom to said detector, *the detector being responsive to a beam of light consisting essentially of said reflected focused incident beam*;
  means for defining an aperture in the path of said incident beam; and
  means for adjusting the size of said aperture whereby to control the size of said incident beam spot on said cantilever;
  said optical system having a numerical aperture sufficient with the wavelength of light from said light source whereby said focused beam forms a spot on said cantilever having a size of 8 µm or less in at least one dimension.

16. In an atomic force microscope of including at least one cantilever mounted therein and an optical detector, the improvement, for generating a small incident beam spot, comprising:
  an optical system including a light source and means for producing a *beam of light consisting essentially of a single beam, which forms said* focused incident beam;
  means for directing said focused incident beam onto said cantilever to reflect therefrom to said detector, *the detector being responsive to a beam of light consisting essentially of said reflected focused incident beam*;
  means for defining an aperture in the path of said incident beam; and
  means for adjusting the shape of said aperture whereby to control the shape of said incident beam spot on said cantilever;
  said optical system having a numerical aperture sufficient with the wavelength of light from said light source whereby said focused beam forms a spot on said cantilever having a size of 8 µm or less in at least one dimension.

23. In an atomic force microscope:
  an optical detector;
  a cantilever having a length of less than 30 µm;
  an optical system including a light source and means for producing a *beam of light consisting essentially of a single beam, which forms said* focused incident beam; and
  means for directing said focused incident beam onto said cantilever to reflect therefrom to said detector, *the detector being responsive to a beam of light consisting essentially of said reflected focused incident beam;*
  *the components of said optical system being arranged so that at least portions of said incident and reflected beams overlap, and including means for separating said reflected beam from said incident beam and directing said separated reflected beam to said detector;*
  said optical system having a numerical aperture sufficient with the wavelength of light from said light source whereby said focused beam forms a spot on said cantilever having a size of 8 µm or less in at least one dimension.

*24. In an atomic force microscope including at least one cantilever mounted therein and an optical detector, the improvement, for generating a small incident beam spot, comprising:*
  *an optical system including a light source and means for producing a beam of light consisting essentially of a single beam, which forms said incident beam, and at least one lens for focusing said incident beam; and*
  *means for directing said focused incident beam onto said cantilever to reflect therefrom to said detector, the detector being responsive to a beam of light consisting essentially of said reflected focused incident beam;*
  *the components of said optical system being arranged so that at least portions of said incident and reflected beams overlap, and including means for separating said reflected beam from said incident beam and directing said separated reflected beam to said detector;*
  *said optical system having a numerical aperture sufficient with the wavelength of light from said light source whereby said focused beam forms said incident beam spot on said cantilever having a size of 8 µm or less in at least one dimension.*

\* \* \* \* \*